United States Patent
Acker et al.

(10) Patent No.: US 6,834,284 B2
(45) Date of Patent: Dec. 21, 2004

(54) PROCESS AND SYSTEM FOR PROVIDING NAME SERVICE SCOPING BEHAVIOR IN JAVA OBJECT-ORIENTED ENVIRONMENT

(75) Inventors: Liane Elizabeth Haynes Acker, Orange Park, FL (US); James Irwin Knutson, Austin, TX (US); Karalee Brown LeBlanc, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 09/373,879

(22) Filed: Aug. 12, 1999

(65) Prior Publication Data

US 2002/0147696 A1 Oct. 10, 2002

(51) Int. Cl.[7] ................................................ G06F 17/30
(52) U.S. Cl. ........................ 707/103; 707/100; 707/102; 717/108
(58) Field of Search ...................... 707/1–3, 100–104.1, 707/200–202, 500–501; 717/1–11, 100–108; 709/309, 315, 217, 316, 105, 310, 328, 330, 230–232, 235–236

(56) References Cited

U.S. PATENT DOCUMENTS

| | | | | |
|---|---|---|---|---|
| 5,692,180 A | * | 11/1997 | Lee ............................. | 707/10 |
| 5,878,411 A | | 3/1999 | Burroughs et al. ............ | 707/4 |
| 5,878,418 A | | 3/1999 | Polcyn et al. ................. | 707/10 |
| 5,893,118 A | * | 4/1999 | Sonderegger ............... | 707/203 |
| 5,920,725 A | * | 7/1999 | Ma et al. ..................... | 717/11 |
| 5,941,947 A | * | 8/1999 | Brown et al. ............... | 709/225 |
| 5,966,702 A | * | 10/1999 | Fresko et al. ................. | 707/1 |
| 6,035,303 A | * | 3/2000 | Baer et al. .................. | 707/103 |
| 6,044,217 A | * | 3/2000 | Brealey et al. ............... | 717/1 |
| 6,061,743 A | * | 5/2000 | Thatcher et al. ............ | 709/302 |
| 6,083,282 A | * | 7/2000 | Caron et al. .................. | 717/6 |
| 6,167,427 A | * | 12/2000 | Rabinovich et al. ........ | 709/201 |
| 6,233,582 B1 | * | 5/2001 | Traversat et al. ........... | 707/102 |
| 6,236,999 B1 | * | 5/2001 | Jacobs et al. ................ | 707/10 |
| 6,256,031 B1 | * | 7/2001 | Meijer et al. ............... | 345/854 |
| 6,298,354 B1 | * | 10/2001 | Saulpaugh et al. ......... | 707/100 |

OTHER PUBLICATIONS

Sun Microsystems, Inc. Java naming and directory interface service provider interface (JNDI SPI), JNDI 1.2, Jul. 14, 1999 pp. 1–50.*

Kristopher Magnusson, Java technology group, Novell Developer notes, Programming Netware with Java, Jan. 1998, pp. 33–53.*

Oracle 8i Java developer's guide, release (8.1.7), www.oradoc.com/ora817/java.817/a83728/01intro2.htm pp. 1–8.*

Sun Microsystems, Inc.; Java Naming and Directory Interface Service Provider Interface (JNDI SPI); Jul. 14, 1999; pp. 1–50.

* cited by examiner

*Primary Examiner*—Srirama Channavajjala
(74) *Attorney, Agent, or Firm*—Duke W. Yee; David A. Mims, Jr.

(57) ABSTRACT

A process and system for providing name service scoping behavior is implemented. In an object-oriented data processing system, a request is received for an initial context for a namespace from a requesting object. A scoped initial context factory object is constructed, and an initial context is requested from the scoped initial context factory object. A class for the scoped initial context factory object may be determined from a variable in a hash table object passed as an argument. In response to the request for an initial context from the scoped initial context factory object, an initial context is requested from a non-scoped initial context factory object. The scoped initial context factory object may be a subclass of the non-scoped initial context factory object. The initial context returned by the non-scoped initial context factory object is scoped to a partition of the namespace, and the scoped initial context is returned. The initial context returned by the non-scoped initial context factory object may be scoped by performing a name service lookup on the partition of the namespace. The requesting object and the scoping object may be implemented in a platform-independent object-oriented programming language, such as Java.

21 Claims, 5 Drawing Sheets

```
    // Default to the system properties for
    // javax.naming.Context.PROVIDER_URL and
    // javax.naming.Context.INITIAL_CONTEXT_FACTORY since these
    // will have to be configured every time we deploy.
801—Context initContext = new InitialContext();

// retrieve the home using simple name lookup
802—homeObject homeObject = initContext.lookup("com/ibm/EJBHomeB");

// narrow to the sub type
803—homeB =(TransferHome)javax.rmi.PortableRemoteObject.narrow(
                               homeObject,
                               TransferHome.class);
```

FIG. 9

```
public WorkgroupCtxFactory extends CNCtxFactory {
    ...
901—public Context getInitialContext (Hashtable env) throws NamingException {
        // use normal provider implementation to get a context
        // for the "root"
902—    Context ctx = super.getInitialContext(env);

903—    // use the context to get at the workgroup tree "root"
        retrun ctx.lookup ("workgroup");
    }
    ...
}
```

Figure 10

PROCESS AND SYSTEM FOR PROVIDING NAME SERVICE SCOPING BEHAVIOR IN JAVA OBJECT-ORIENTED ENVIRONMENT

BACKGROUND OF THE INVENTION

1. Technical Field

The present invention relates generally to an improved data processing system and, in particular, to a process and system for improving object interaction in an object-oriented environment. Specifically, the present invention relates to a process and system for improving name service behavior in an object-oriented programming environment.

2. Description of Related Art

Today's world of networking involves both Intranets for localized access and Internets for global access. Naming and directory services are vitally important for finding and/or accessing persons, machines, networks, services, and applications. Any naming service should be able to characterize the arrangement of objects and identification of specific entities in a human understandable format.

A namespace typically involves the composite of several different naming facilities. URLs (Universal Resource Locators) are a good example of a composite name space. At the top level, the Internet Domain Name Service (DNS) may be used. Name services within an organization vary from location to location. Some examples are LDAP (Lightweight Directory Access Protocol) or NDS (Novell Directory Services) or NIS (Network Information System). However, from a user perspective, this composition of different namespaces should be transparent.

The Java Naming and Directory Interface (JNDI) is a set of software tools from Sun Microsystems, Inc. that provides directory and naming functionality for Java applications. The JNDI architecture consists of an API (Application Programming Interface) and an SPI (Service Provider Interface). To find an object in the namespace, a context object is retrieved which represents the root of the namespace. The retrieved context object is then used to lookup an object in the namespace by supplying a path from that context to the object's location in the namespace.

Scoping of names occurs in many domains of computer science. For example, two different functions in an application program, Function 1 and Function 2, may each use local variables named "i" and "j" to control access to a two-dimensional array. Although the same names are used for similar variables within the namespace of the application program, there is no conflict between the variable names due to the scoping of the variable names within the partitions of Function 1 and Function 2. The "i" and "j" inside of the block of code named Function 1 is not visible from inside of the block of code named Function 2, and similarly, the "i" and "j" within Function 2 is not visible within Function 1. This limiting of the scope of names is extremely useful because a programmer does not have to be concerned whether a variable name that has been chosen for an object happens to be used elsewhere in the same program.

Namespace scoping works very similarly to scoping of variables in programming. It works by using arbitrary partitioning of the namespace tree (a hierarchy of locations arranged in a tree) into branches which represents scopes. Accessing an object in the namespace under a particular scope can be performed by fully specifying the path from the root of the namespace tree to that object including the scoping branch of the tree. This is an explicit form of scoping. However, implicit scoping implies being able to use a path which is not fully specified, yet still navigate the namespace tree from the root using a particularly scoped branch of that tree to lookup an object.

JNDI does not specify any scoping behavior for a name service. As an example, consider an Enterprise JavaBean (EJB) application that is composed of many EJBs that must use a naming system to resolve references to each other. In other words, the names must be clearly distinguishable to avoid conflicts and collisions. Enterprise JavaBeans objects (EJBs) usually handle references to other EJBs by defining property settings in the EJB environment data. These property settings typically define the fully qualified namespace path as well as the context object used to access other EJBs. This is because the namespace name and server host/port registered for the EJB cannot be predicted by the developer of the EJB. Since this data is defined as part of the deployment data of an EJB at deployment time, it requires redeployment and recompilation if it is to be changed. An explicit form of namespace scoping could be used. However, changing the deployment data for a particular scope and redeploying can be very time consuming, possibly taking hours for large systems. This process is also very error prone since the data must be changed manually in multiple places (at least once for each EJB) and must be consistent throughout the entire application. In other words, if an EJB is to be used under a new scope, it must be bound (registered) in the namespace under the new scope and all references to it must be changed to use the new scope. This becomes increasingly difficult as the number of EJBs and their relationships increase.

Therefore, it would be advantageous to have a mechanism to provide implicit name scoping behavior, and it would be especially advantageous to have a mechanism for name scoping behavior within JNDI.

SUMMARY OF THE INVENTION

The present invention implements a process and system for providing name service scoping behavior. In an object-oriented data processing system, a request is received for an initial context for a namespace from a requesting object. A scoped initial context factory object is constructed, and an initial context is requested from the scoped initial context factory object. A class for the scoped initial context factory object may be determined from a variable in a hash table object passed as an argument. In response to the request for an initial context from the scoped initial context factory object, an initial context is requested from a non-scoped initial context factory object. The scoped initial context factory object may be a subclass of the non-scoped initial context factory object. The initial context returned by the non-scoped initial context factory object is scoped to a partition of the namespace, and the scoped initial context is returned. The initial context returned by the non-scoped initial context factory object may be scoped by performing a name service lookup on the partition of the namespace. The requesting object and the scoping object may be implemented in a platform-independent object-oriented programming language, such as Java.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
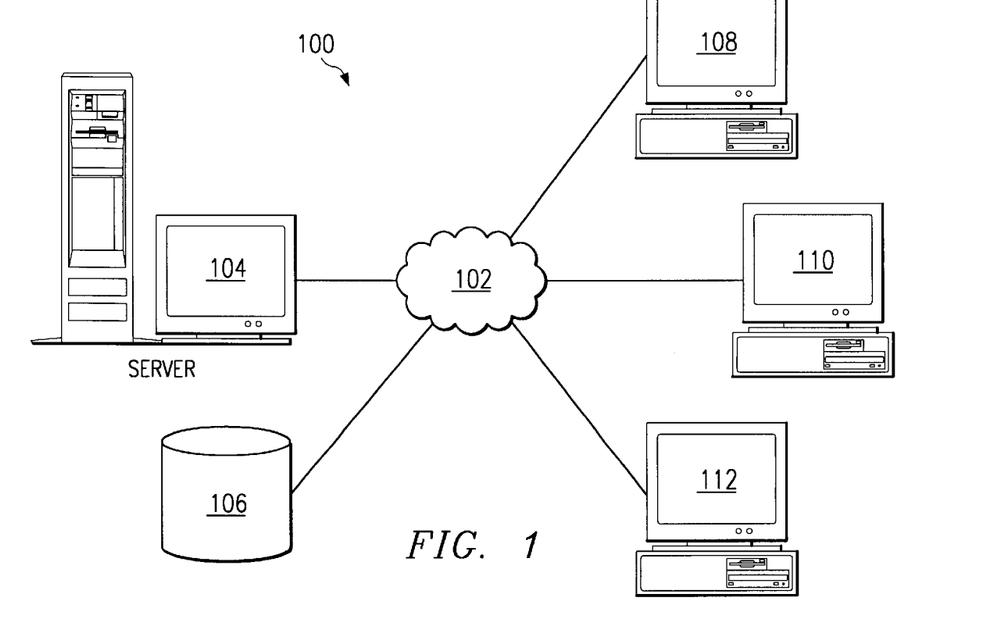
FIG. 1 is a pictorial representation of a distributed data processing system is depicted in which the present invention may be implemented.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown. In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

The JNDI SPI provides the means by which developers can write different naming and directory service providers and make them available so that the corresponding services are accessible from applications that use the JNDI API. A service provider is a set of modules that together satisfy JNDI API requests. In addition, because JNDI allows the use of names that span multiple name spaces, one service provider implementation may need to interact with another in order to complete an operation. The SPI provides methods that allow different provider implementations to cooperate to complete client JNDI operations.

There are several types of implementations that sit beneath the JNDI API. A service provider contains, at a minimum, a context implementation. A context implementation implements the Context interface or any of its subinterfaces. The complexity of the implementation depends primarily on the complexity on the underlying service and, secondarily, on the number of JNDI features that the implementation supports. A context implementation can be accessed in different ways. The most common way is to access it from the initial context. A context implementation can be accessed from the initial context via an initial context factory or a URL context factory. The JNDI architecture defines components/implementations that can be used to augment the behavior of context implementations. This allows users and applications to customize the implementation. These components are supported through factories. Two types of factories that are relevant are: object factories, which transform data stored in naming/directory services into Java types that are more natural to the Java application; and state factories, which are for transforming objects of Java types natural to the program into formats suitable for storage into naming/directory services.

JNDI encourages providers to supply implementations of the Context interface and its subinterfaces that are natural and intuitive for the Java application programmer. For example, when looking up a printer name in the namespace, it is natural for the programmer to expect to get back a printer object on which to operate. Similarly, when storing an application's object into the underlying service, it is most portable and convenient if the application does not have to know about the underlying data representation. However, what is bound in the underlying directory or naming services typically are not objects in the Java programming language but merely reference information which can be used to locate or access the actual object. The reference, in effect, acts as a pointer to the real object. In the printer example above, what is actually bound might be information on how to access the printer, e.g., its protocol type, its server address, etc. To enable this model for the application developer, the context implementation must do the transformation of the data to or from the underlying service into the appropriate objects in the Java programming language. Different implementations may achieve this goal in different ways. One context implementation might have access to all of the implementation classes of objects that a directory can return. Another context implementation might have a special class loader for locating implementation classes for its objects. JNDI provides utilities for context implementations to use when reading or storing objects in the Java programming language in a format-independent way to the underlying service.

Each instance of the Context interface or its subinterfaces can have an associated environment which contains preferences expressed by the application of how it would like to access the services provided by the context. For example, security-related information may be found in an environment that specifies the security credentials of a user and the desired level of security. Environment properties are defined generically in order to ensure maximum portability. Individual service providers may map these generic properties to characteristics appropriate for their service.

When creating an initial context, either using the constructors from the InitialContext class or its subclasses, the application can supply an environment as a parameter. The parameter is represented as a hash table. The JNDI class library may augment the data from this parameter with data from other sources and pass this information to the context implementation.

Since all methods in a naming service are performed relative to a context, an application needs a starting context in order to invoke them. This starting context is referred to as the "initial context." The bindings in the initial context are determined by policies set forth by the initial context implementation. For example, the initial context might contain a binding to the Internet DNS name space, a binding to the enterprise-wide name space, or a binding to a personal directory belonging to the user who is running the application. An application obtains an initial context by making a call using a statement such as:

"Context initContext=new InitialContext( );".

An alternate constructor allows an environment to be passed as an argument. This allows the application to pass in preferences or security information to be used in the construction of the initial context. Subsequent to getting an initial context, the application can invoke methods in the Context class. The InitialContext class and its subclasses select an implementation using a default algorithm that can be overridden by installing an initial context factory builder. An initial context factory is a class that creates an instance of a context. The factory is used by the constructor of the InitialContext class or subclass. Given an environment, the factory returns an instance of the Context interface or its subinterfaces. More information about contexts and their implementation may be found in "Java Service Provider Interface (JNDI SPI)", JNDI 1.2, Sun Microsystems, Inc., Jul. 14, 1999, herein incorporated by reference.

Figure 2:
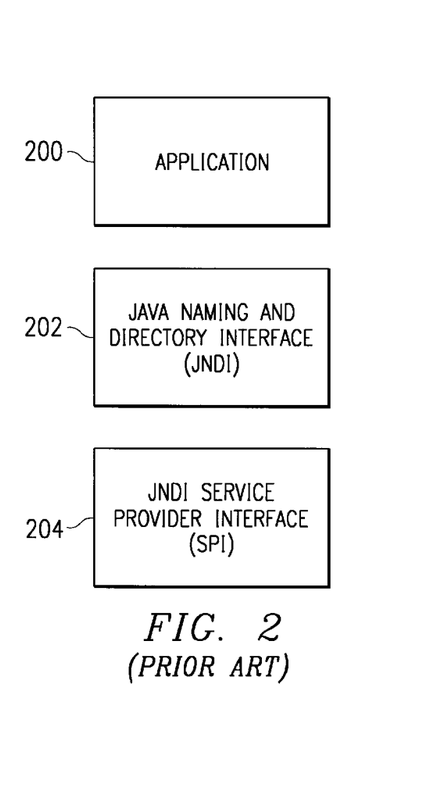
FIG. 2 depicts a prior art software organization of application layers using JNDI.

With reference now to FIG. 2, a figure depicts a prior art software organization of application layers using JNDI. Application program 200 uses the JNDI API 202 to access a particular service provider interface 204.

Figure 3:
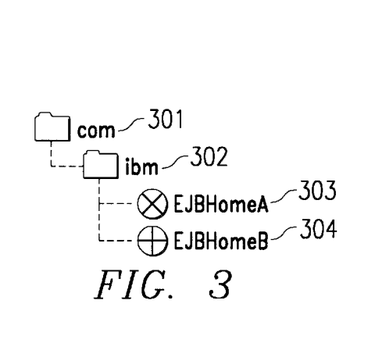
FIG. 3 depicts an example namespace showing a hierarchy of names that are accessible through a naming service.

With reference now to FIG. 3, a figure depicts an example namespace showing a hierarchy of names that are accessible through a naming service. The term "directory" is defined herein as "portion of a namespace," "node of a namespace tree," a context, or its equivalent. Root directory 301 has the name "com" with subordinate directory 302 having a subdirectory name "ibm" and target objects 303 and 304 having names "EJBHomeA" and "EJBHomeB". Each of these directories may contain objects, such as EJBs, that may be accessed or manipulated through various methods supported by the naming service.

Figure 4:
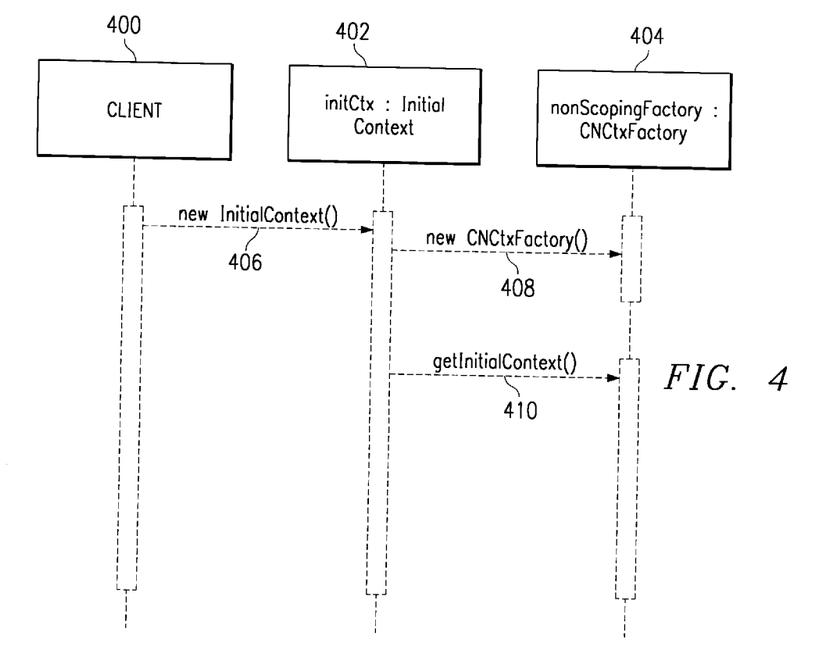
FIG. 4 is an object interaction diagram showing a prior art organization of typical objects and method calls between the objects for obtaining a context for naming operations.

With reference now to FIG. 4, an object interaction diagram shows a prior art organization of typical objects and method calls between the objects for obtaining a context for naming operations. Client 400 obtains an initial context by calling the constructor for the JNDI InitialContext class 402 via method invocation 406. The InitialContext constructor examines the java.naming.factory.initial setting and obtains an initial context factory object via method invocation 408, which in the example is obtained by instantiating a new instance of the CNCtxFactory class 404. The InitialContext constructor then asks the factory for a context by calling getInitialContext( ) via method invocation 410.

Figure 5:
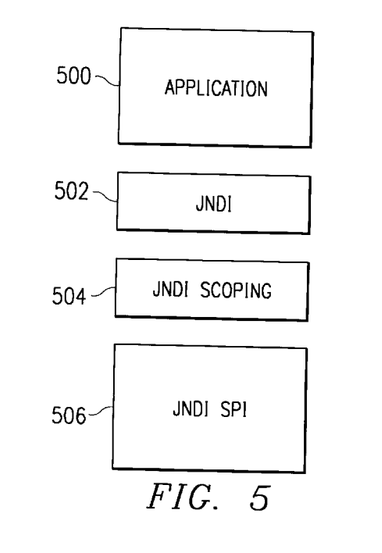
FIG. 5 depicts a software organization of application layers incorporating JNDI and name scoping in accordance with the present invention.

With reference now to FIG. 5, a figure depicts a software organization of application layers incorporating JNDI and name scoping in accordance with the present invention. Application program 500 uses JNDI API 502, similar to application program 200 using JNDI API 202 in FIG. 2. However, in the present invention, the JNDI API now goes through JNDI scoping layer 504 to access a particular service provider interface 506.

Figure 6:
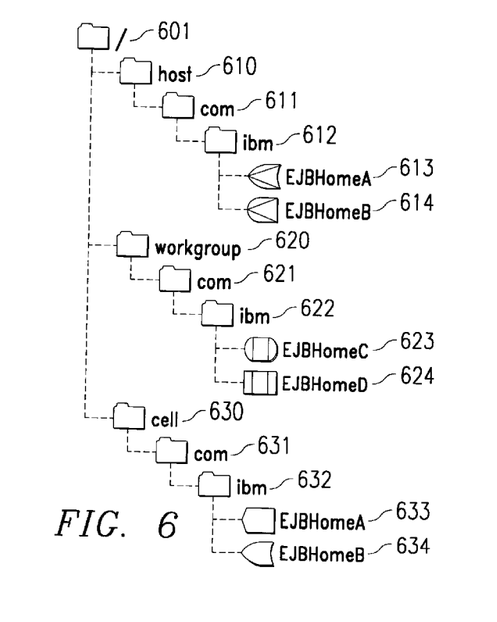
FIG. 6 depicts an example namespace that contains a hierarchy of names with potentially colliding names.

With reference now to FIG. 6, a figure depicts an example namespace that contains a hierarchy of names with potentially colliding names. Root directory "/" 601 leads to three directories 610, 620, and 630 having the names "host", "workgroup", and "cell," respectively. Each of these directories contain subdirectories 611, 621, and 631, respectively, having the same name "com," which in turn have subdirectories 612, 622, and 632, respectively, having the same name "ibm" to reach the targets. Subdirectory 612 has target objects 613 and 614; subdirectory 622 has target objects 623 and 624; and subdirectory 632 has target objects 633 and 634. Target objects 613 and 633 and target objects 614 and 634 can have the same names, "EJBHomeA" and "EJBHomeB," respectively, for both the "host" directory and the "cell" directory. References to these directories can be made unique using to the scoping behavior of the present invention, as described below.

Figure 7:
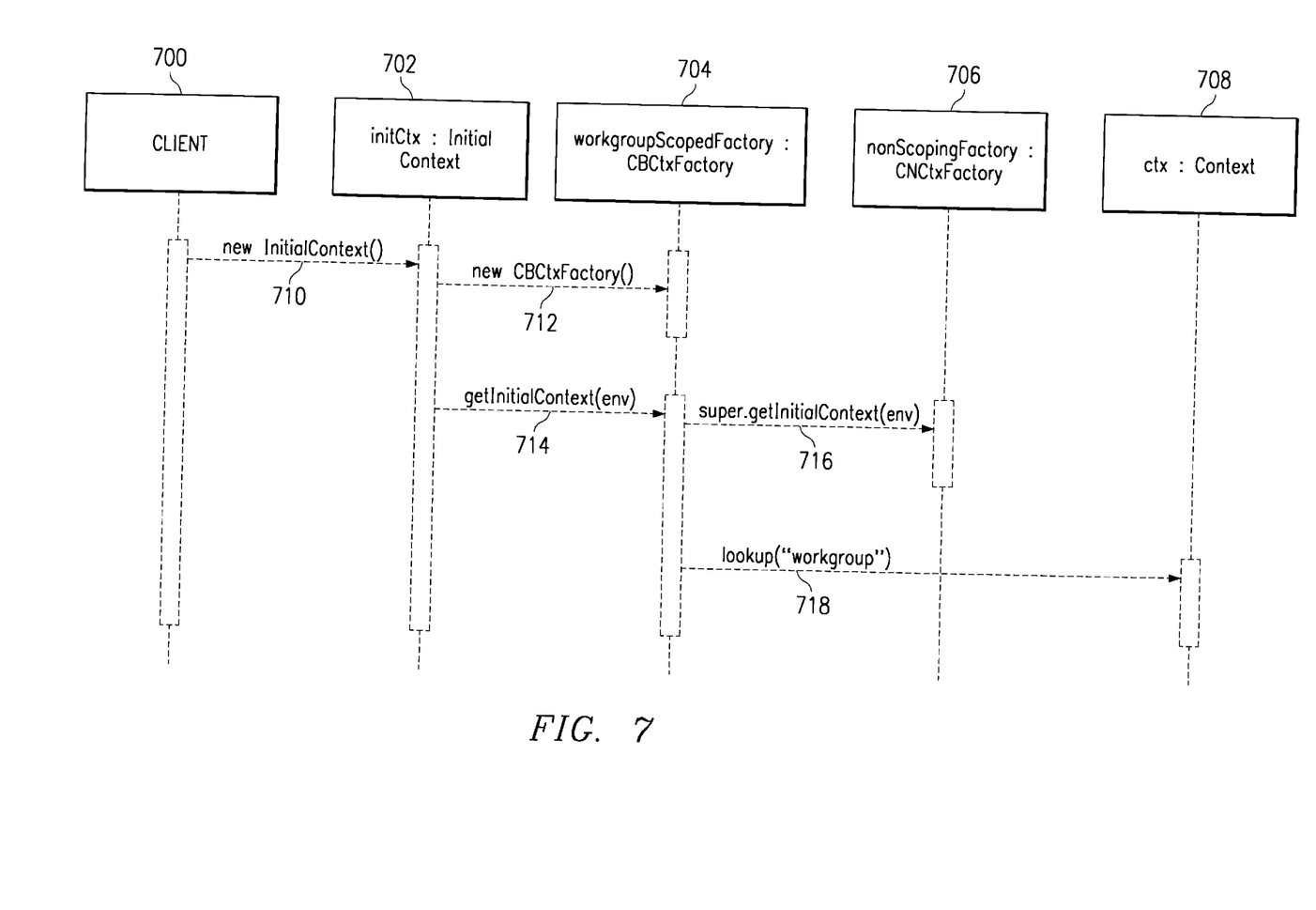
FIG. 7 is an object interaction diagram showing an organization of objects and the method calls between the objects for obtaining a scoped context for naming operations in accordance with the present invention.

With reference now to FIG. 7, an object interaction diagram shows an organization of objects and the method calls between the objects for obtaining a scoped context for naming operations in accordance with the present invention. The object interaction diagram shown in FIG. 7 contains the objects Client 700, Initial Context 702, scoped CBCtxFactory 704, non-scoped CNCtxFactory 706, and Context 708.

Scoped CBCtxFactory 704 is the intermediate layer that provides the scoping behavior as shown in FIG. 5. In this example, it is assumed that the "workgroup" scope shown in the example in FIG. 6 is desired. Although CBCtxFactory class is a subclass of CNCtxFactory, it is not a requirement that the context factory that provides the scoped initial context must be a subclass of another context factory. A delegation model could just as easily be used, or the scoped initial context factory could completely implement the javax.naming.spi.InitialContextFactory interface.

If the client desires access to the scoped portion of the name tree, the application is configured to run with two properties: java.naming.provider.url, which specifies the host and port at which the namespace resides, and java.naming.factory.initial, which specifies the factory class to be used by JNDI. Since the client desires to use the "workgroup" scope, java.naming.factory.initial specifies that the "workgroup" scoped class CBCtxFactory 704 should be used.

Client application 700 runs and requests a new initial context class by running the constructor via method invocation 710 for the JNDI InitialContext class 702. The InitialContext class constructor examines the java.naming.factory.initial setting and instantiates a new CBCtxFactory class instance via method invocation 712, which is essentially the normal mode of operation for JNDI.

The InitialContext constructor eventually asks the factory for a context by calling the getInitialContext method 714.

Since CBCtxFactory 704 is a subclass, it makes an "up" call to the superclass implementation CNCtxFactory via method invocation 716 to get the initial context. However, this is the root context for the superclass-managed namespace, not the "workgroup" scoped portion of the namespace. The "workgroup" scoped factory needs to navigate the namespace to find the root of the "workgroup" scoped part of the tree. Therefore, it does a lookup("workgroup") via method invocation 718 for the "workgroup root" using the context returned by the superclass. The "workgroup" scope is then returned to the InitialContext class instance, which in turn returns it to the client. When the client uses the returned context to perform name lookups, the lookups are performed relative to the "workgroup"-scoped portion of the namespace tree.

The above illustrates a simple form of scoping. One could also apply additional behavior in the getInitialContext( ) method of the initial context factory or in the Context lookup ( ) method implementation in order to perform actions like name lookup in multiple scopes. For example, a lookup is performed in the "host" scope as a first attempt, the "workgroup" scope as a second attempt, and then the "cell" scope as a final attempt. Since scoping is an arbitrary partitioning function, the scoped partition may be anything a name service provider wishes to implement, which could then be further partitioned by a customer to include partitions such as application scopes. This implies the ability to nest namespace partitioning or to use a variety of namespaces, all using standard JNDI coding techniques without having to change code to use new scoping behavior.

Figure 8:
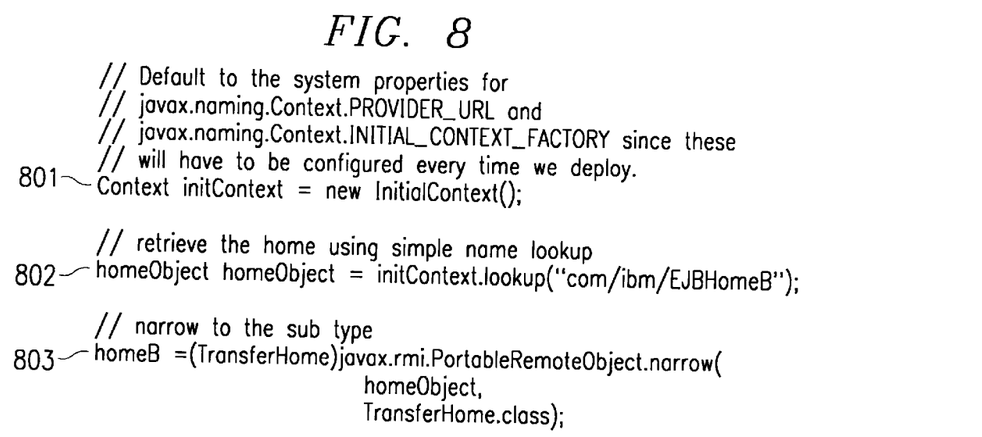
FIG. 8 is a figure showing Java code for a client application that may be used in conjunction with the present invention.

With reference now to FIG. 8, a figure shows Java code for a client application that may be used with the present invention. The InitialContext( ) constructor is first called to create an instance called initContext (statement 801). Then the "lookup" method of this instance is called passing the desired location, which is "com/ibm/EJBHomeB" in this example (statement 802). In the final step, the method "narrow" from the javax.rmi.PortableRemoteObject class is used to type cast to the appropriate subtype (statement 803). Since the client code is isolated from the scoping mechanism, the client code performs the same actions with respect to JNDI whether or not the scoping behavior of the present invention is implemented.

Figure 9:
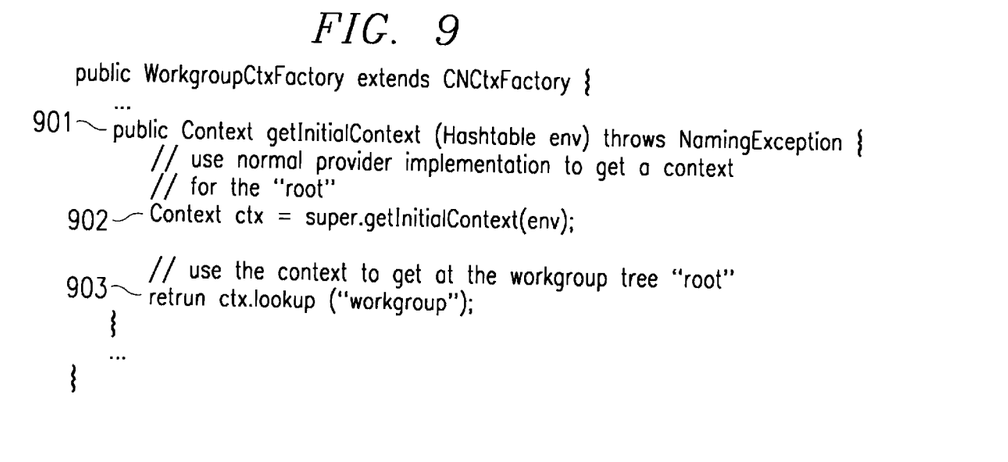
FIG. 9 is a figure showing Java code for an initial context factory that may be used to implement the scoping mechanism of the present invention.
Figure 10:
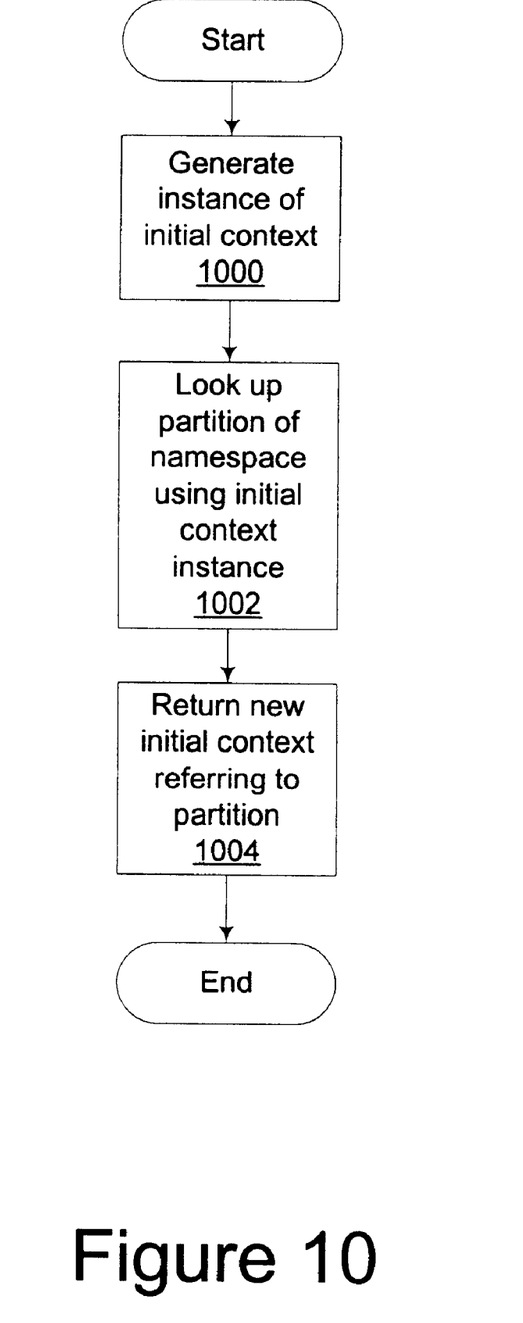
FIG. 10 is a flowchart representation of the process implemented by the Java code in FIG. 9.

With reference now to FIG. 9, a figure shows Java code for an initial context factory that may be used to implement the scoping mechanism of the present invention. Accompanying FIG. 10 is a flowchart representation of the process implemented by the Java code in FIG. 9. FIG. 9 shows the subclass relationship between the WorkgroupCtxFactory and the parent class CNCtxFactory. The cell to getInitialContext receives an environment (env) in the form of a Hashtable, which is a built-in Java class (statement 901). First, an appeal is made to the parent class, i.e., superclass to create the Context named "ctx" (statement 902; step 1000). A lookup operation for the "workgroup" scope (statement 903; step 1002) is returned (statement 903; step 1004), thus putting the client in the proper branch of the scoping tree.

The advantages of the present invention should be apparent in view of the detailed description of the invention provided above. JNDI does not specify scoping behavior for name services. However, this is a very useful feature and is extremely important in application development. As an example, an EJB application that is composed of multiple EJBs must use a naming system to resolve the references to each other. The configuration of these references is typically handled by including property settings in the EJB context environment data. This data is defined at deployment time and requires redeployment/recompilation if it is to be changed. Given that the flow of development typically follows a route of Unit Test on local machines, Functional Test and Integration Test on departmental machines, and Production Test on globally available machines, each set of machines using a different name service scope, it is desirable to allow rebinding of the EJBs in an appropriate scope of the namespace without having to change the EJB deployment data and redeploying. Changing the deployment data to match a particular scope and redeploying can be time consuming for large applications and error prone since the data must remain consistent by binding into the proper scope.

The resolution provided by the present invention uses non-scoped naming strings for lookup within the namespace. When the application is installed, it is configured to use a particular initial context factory object, and the initial context factory object determines the scoping to be used, i.e., the factory object traverses the namespace tree as appropriate to reach the proper scope before returning the context for the desired scope. This allows for a standard JNDI configuration mechanism, i.e., the initial context property, to be used to specify scoping behavior. Scoping changes become a system management issue of configuring the EJB runtime environment rather than a deployment-time issue. Without the mechanism provided by the present invention, a scoping change would require changing the deployment data and redeploying the EJB. Since such changes typically occur in cycles as software bugs are fixed in various phases of application development, the chance for error is compounded, and cycle time increases dramatically. The present invention significantly reduces errors and cycle time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process for implementing a name service, the process comprising the computer-implemented steps of:
   receiving a request for an initial context for a namespace;
   generating an instance of the initial context;
   using the instance of the initial context to locate within the namespace a partition of the namespace; and
   returning a narrowed initial context referring to only the partition of the namespace.

2. The process of claim 1, wherein the process is implemented in a platform-independent object-oriented programming language.

3. The process of claim 2 wherein the platform-independent object-oriented programming language is the Java programming language.

4. A process for implementing a name service in an object-oriented environment, the process comprising the computer-implemented steps of:
   constructing a scoped initial context factory object;
   requesting an initial context from the scoped initial context factory object;
   in response to the request for an initial context from the scoped initial context factory object, requesting an initial context from a method belonging to a non-scoped initial context factory object class;
   using the initial context returned by the method to locate within the namespace a partition of the namespace; and
   returning a narrowed initial context referring to only the partition the namespace.

5. The process of claim 4 wherein a class or the scoped initial context factory object is determined from a variable in a hash table object.

6. The process of claim 4 wherein the scoped initial context factory object belongs to a subclass of the non-scoped initial context factory object lass.

7. The process of claim 4 wherein the process is implemented in a platform-independent object-oriented programming language.

8. The process of claim 7 wherein the platform-independent object-oriented programming language is the Java programming language.

9. The process of claim 8, wherein the scoped initial context factory object is determined from a java.naming.factory.initial property.

10. A data processing system for implementing a name service in an object-oriented environment, the data process system comprising:
    constructing means for constructing a scoped initial context factory object;
      first requesting means for requesting an initial context from the scoped initial context factory object;
      second requesting means for requesting, in response to the request for an initial context from the scoped initial context factory object, an initial context from a method belonging to a non-scoped initial context factory object class;
      using means for using the initial context returned by the method to locate within the namespace a partition of the namespace; and
      returning means for returning a narrowed initial context referring to only the partition of the namespace.

11. The data processing system of claim 10 wherein a class for the scoped initial context factory object is determined from a variable in a hash table object.

12. The data processing system of claim 10 wherein the scoped initial context factory object belongs to a subclass of the non-scoped initial context factory object class.

13. The data processing system of claim 10 wherein at least on of the constructing means, first requesting means, second requesting means, using means and narrowing means is implemented in a platform-independent object-oriented programming language.

14. The data processing system of claim 13 wherein the platform-independent object-oriented programming language is the Java programming language.

15. The data processing system of claim 14, wherein the scoped initial context factory object is determined from a java.naming.factory.initial property.

16. A computer program product in a computer-readable medium for use in a data processing system for implementing a name service in an object-oriented environment, the computer program product comprising:
    first instructions for constructing a scoped initial context factory object;
    second instructions for requesting an initial context from the scoped initial context factory object;
    third instructions for requesting, in response to the request for an initial context from the scoped initial context factory object, an initial context from a method belonging to a non-scoped initial context factory object class;
    fourth instructions for using the initial context returned by the method to locate within the namespace a partition of the namespace; and
    fifth instructions for returning a narrowed initial context referring to only the partition of the namespace.

17. The computer program product of claim 16 wherein a class for the scoped initial context factory object is determined from a variable in a hash the object.

18. The computer program product of claim 16 wherein the scoped initial context factory object belongs to a subclass of the non-scoped initial context factory object class.

19. The computer program product of claim 16 wherein the computer program product is implemented in a platform-independent object-oriented programming language.

20. The computer program product of claim 19 wherein the platform-independent object-oriented programming language is the Java programming language.

21. The computer program product of claim 20, wherein the scoped initial context factory object is determined from a java.naming.factory.initial property.

* * * * *

UNITED STATES PATENT AND TRADEMARK OFFICE
CERTIFICATE OF CORRECTION

PATENT NO. : 6,834,284 B2
DATED : December 21, 2004
INVENTOR(S) : Acker et al.

It is certified that error appears in the above-identified patent and that said Letters Patent is hereby corrected as shown below:

Column 9,
Line 18, after "class" delete "or" and insert -- for --.
Line 23, after "object" delete "lass" and insert -- class --.

Column 10,
Line 8, after "least" delete "on" and insert -- one --.
Line 37, after "hash" delete "the" and insert -- table --.

Signed and Sealed this

Fourth Day of April, 2006

JON W. DUDAS
*Director of the United States Patent and Trademark Office*